F. B. SHEPPARD.
COMPASSES.
APPLICATION FILED NOV. 26, 1918.
1,298,585.
Patented Mar. 25, 1919.
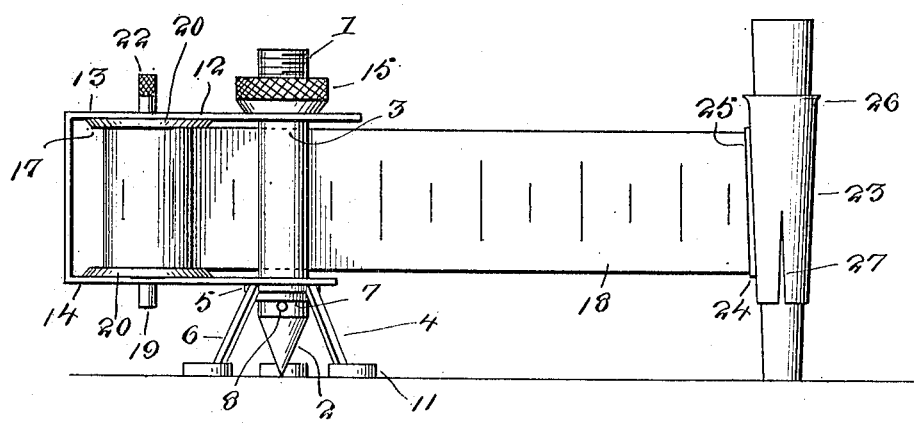
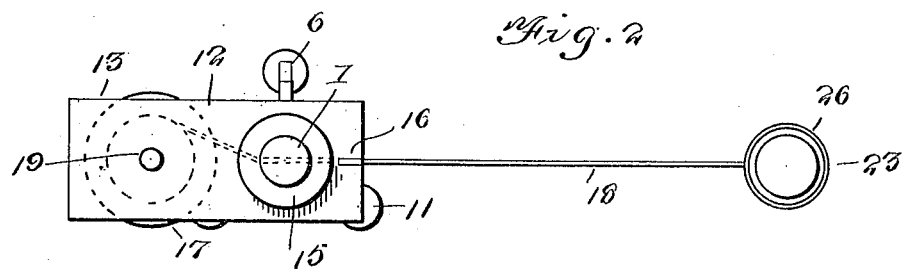
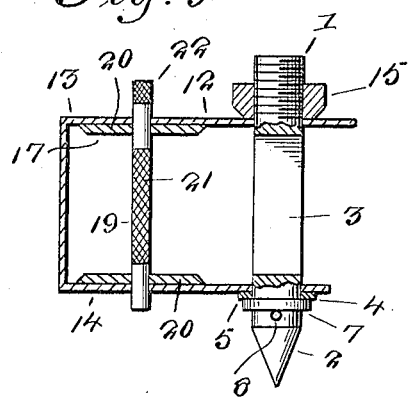
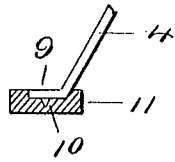
Inventor
F. B. Sheppard
By Victor J. Evans
Attorney
Witnesses

UNITED STATES PATENT OFFICE.

FLOYD B. SHEPPARD, OF WAYLAND, NEW YORK.

COMPASSES.

1,298,585.   Specification of Letters Patent.   Patented Mar. 25, 1919.

Application filed November 26, 1918. Serial No. 264,188.

*To all whom it may concern:*

Be it known that I, FLOYD B. SHEPPARD, a citizen of the United States, residing at Wayland, in the county of Steuben and State of New York, have invented new and useful Improvements in Compasses, of which the following is a specification.

This invention is an improved compass, especially adapted for use for drawing circles, arcs and curves on a black board or other suitable surface, the object of the invention being to provide an improved compass of this kind which is simple in construction, is extremely compact, and which can be used for drawing circles of any desired radius.

With the above and other objects in view, the invention consists in the construction, combination and arrangement of devices hereinafter described and claimed.

In the accompanying drawings:

Figure 1 is a perspective view of the compass constructed and arranged in accordance with my invention.

Fig. 2 is a plan of the same, showing the compass in use.

Figs. 3 and 4 are detail sectional views.

In the embodiment of my invention, I provide an axis stud 1 which is pointed at one end as at 2 to form the center of a circle to be drawn by the compass. The axis stud has a slot 3 extending therethrough. A supporting base 4 is provided which comprises a central portion 5 having three or any suitable number of radially arranged legs 6. The central portion of the supporting base is provided with a central opening through which the axis stud extends and so that the axis stud is pivotally mounted in the base. A washer 7 is arranged on the axis stud below the central portion of the base and is held in contact therewith by a pin 8. The legs of the supporting base have outwardly turned lower portions 9 each of which is provided on its under side with points 10. Cushions 11 of rubber or other suitable material are secured on the under sides of the portions 9, the points 10 being embedded in said cushions and serving to assist in holding them securely in place. The cushions present friction surfaces which enable the supporting base to be readily held against movement when placed on a black board or the like to form the center of a circle which it is desired to inscribe on the black board.

A substantially U-shaped frame 12 has flattened horizontal upper and lower spring arms 13, 14 through which the axis stud extends so that the said frame is secured to the axis stud for rotation therewith. The lower arm 14 of the frame bears on the center of the supporting base. The upper arm 13 is movable longitudinally to some extent with respect to the axis stud and may be held at any desired adjustment by means of the thumb nut 15 which is threaded on the upper portion of the axis stud as shown. The said arm 13 of the frame has at its shorter end, which projects from one side of the axis stud, a parallel gage slot 16.

A reel or drum 17 for a tape line 18 of any suitable length has its shaft 19 mounted in bearings in the upper and lower arms of the frame 12. The heads 20 of the tape reel are beveled or rounded on their opposing sides at their edges, to prevent the tape from running upon their outer edges. The central portion of the reel shaft is milled or roughened as at 21 to facilitate the attachment and securing of the inner end of the tape thereto. The upper end of the reel shaft is also knurled as at 22 to enable the reel to be readily turned by the thumb and forefinger to wind up the tape. The tape extends from the reel out through the centrally arranged slot 3 with which the axis stud 1 is provided.

The outer end of the tape is attached to one side of a tubular chalk holder 23, said outer end of the tape being inserted in a slit 24 and the chalk holder having outwardly turned lips 25 at the sides of said slit and which bear against the tape and correspond with the outer end or No. 1 of a scale or other unit of measure with which the tape is provided. The chalk holder is slightly enlarged at its upper end as at 26 to facilitate the placing of the chalk therein and the chalk holder is provided on the side opposite the slit 24 with a split 27 which extends to the lower or smaller end of the chalk holder and widens slightly toward said end and adapts the chalk holder to frictionally grip the chalk therein.

To use the compass for drawing a circle or arc of any desired radius the tape is drawn from the reel to a corresponding extent through the slot 3 of the axis stud, the scale on the tape enabling this to be readily determined, as will be understood. With the left hand the compass is held with the supporting base bearing on the black board or other surface, with the point of the axis stud forming the center of the desired circle, and with the right hand the user grasps the chalk holder and draws the tape straight out from the axis stud and in line with the parallel gage or slot 16 of the upper arm 13 of the reel frame. Casual rotation of the reel may be prevented by screwing the thumb nut 15 on the arm 13 to cause the latter to press on the upper head of the tape reel and act as a brake. The desired circle or arc is drawn on the black board by the chalk, as will be understood.

While I have herein shown and described preferred embodiments of my invention, I will have it understood that changes may be made in the form, proportion and construction of the several parts, without departing from the spirit of my invention.

What is claimed as new is:

1. A compass of the class described comprising an axis stud, a frame attached thereto, a tape reel mounted in said frame, means to attach a chalk to the free end of the tape and a supporting base for said stud comprising a collar encircling the stud, legs secured to said collar and washers carried by the lower ends of said legs.

2. In a compass of the class described, an axis stud, a frame attached thereto and extending from one side thereof, a tape reel mounted in said frame, means to attach a chalk or the like to the free end of the tape, said frame having a spring arm movable with respect to the axis stud and bearing on one end of the reel, and a nut threaded on the axis stud and bearing on said spring arm to cause the latter to apply brake pressure on the reel.

3. A compass of the class described, comprising a supporting base, an axis stud mounted for rotation in the base, a frame mounted on the axis stud and extending from one side thereof, and a tape reel mounted in said frame, the said axis stud having a slot extending therethrough for the passage of the tape from the reel.

4. A compass of the class described, comprising a supporting base, an axis stud mounted for rotation in the base, a frame mounted on the axis stud and extending from one side thereof, and a tape reel mounted in said frame, the said axis stud having a slot extending therethrough for the passage of the tape from the reel, said frame also having a parallel gage in line with the tape slot.

In testimony whereof I affix my signature.

FLOYD B. SHEPPARD.

Copies of this patent may be obtained for five cents each, by addressing the "Commissioner of Patents, Washington, D. C."